United States Patent
Miller et al.

(12) 
(10) Patent No.: US 6,592,978 B1
(45) Date of Patent: *Jul. 15, 2003

(54) THREE PART HIGH MOISTURE BARRIER FOR PACKAGES

(75) Inventors: Mark Ralph Miller, Louisa, VA (US); Kevin Junior Carter, Gordonsville, VA (US)

(73) Assignee: Kloeckner Pentaplast of America, Inc., Gordonsville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/117,519

(22) Filed: Apr. 5, 2002

Related U.S. Application Data

(63) Continuation-in-part of application No. 10/061,797, filed on Feb. 1, 2002.

(51) Int. Cl.[7] .................. B32B 27/08; B32B 27/30; B32B 27/32; B32B 27/36; B65D 83/04
(52) U.S. Cl. .......... 428/213; 428/332; 428/337; 428/422; 428/423.1; 428/480; 428/500; 428/522; 428/523; 428/220; 206/531; 206/532
(58) Field of Search .................. 428/220, 332, 428/337, 421, 422, 480, 500, 522, 523, 213, 423.1, 424.6; 206/531, 532

(56) References Cited

U.S. PATENT DOCUMENTS

| | | | |
|---|---|---|---|
| 5,686,081 A | 11/1997 | Ono et al. | 424/400 |
| 5,874,035 A | * 2/1999 | Tsai et al. | 264/173.13 |
| 5,968,663 A | 10/1999 | Muggli | 428/461 |
| 6,099,682 A | * 8/2000 | Krampe et al. | 156/289 |
| 6,306,503 B1 | 10/2001 | Tsai | 428/421 |

* cited by examiner

*Primary Examiner*—Ramsey Zacharia
(74) *Attorney, Agent, or Firm*—Peter E. Rosden

(57) ABSTRACT

A three part laminated material for use in making blister packages and a method of making such a material. The material is comprised of a central core layer of fluoropolymer based sheet material to each side of which a separate polymer film is adhesively attached. These separate films may be symmetrical or asymmetrical as regards each other. In the preferred embodiment, each of the polymer films is polyvinyl chloride, although a variety of chemically different films may be used. The disclosed material provides a high moisture barrier, reduced package curl, a stable inter-laminar structure and outer surfaces which lend themselves well to bonding with other materials as well as to printing and coating.

21 Claims, 1 Drawing Sheet

THREE PART HIGH MOISTURE BARRIER FOR PACKAGES

CROSS-REFERENCES TO RELATED APPLICATIONS

This application is a continuation-in-part of U.S. application Ser. No. 10/061,797, filed on Feb. 1, 2002.

TECHNICAL FIELD

The subject invention relates generally to a three component laminate barrier film used for packaging and a method for making such a film. The film is particularly useful where a high barrier material having a fluoro-polymer content is used in pharmaceutical packaging and must be bonded on both surfaces with other materials to produce a blister package.

BACKGROUND OF THE INVENTION

Blister packaging, has applications in a variety of industries including the food and medical markets. But it is in the pharmaceutical area where metered provision to patients of ampoules, tablets or capsules to patients provided in blister packs occurs that it has found its broadest application in the past. This type of packaging typically consists of a thermoformed blister to the top side of which an information bearing material is applied and to the bottom side of which a tear susceptible material such as aluminum foil is applied. Blister packages used in the pharmaceutical industry also have particularly demanding requisites which the packaging industry has found difficult to meet concurrently in a single product formulation.

One of these demands is for a package having high moisture vapor barrier characteristics. This type of barrier is called for to protect stored products from environmentally-based deterioration. Such a barrier can be achieved by including a layer comprised of a fluoro-polymer material such as ACLAR®-laminated vinyl. ACLAR® is a poly chloro-tri-fluoro ethylene film and is a registered trademark of Honeywell, Inc. However, due precisely to their high fluorine content, it is extremely difficult for other substrates to adhere to such films. As a result, it has been necessary to use separate adhesives and adhesive application and curing techniques to achieve a bond between other substrates, such as aluminum foil or PVC, and laminates having a high fluorine content. For example, a dry-bond laminating adhesive may be used to provide adequate adhesion between PVC and a high fluorine content laminate.

In some blister package designs, it is desirable to apply a printed PVC card displaying important product information to one side of a high fluorine content surface and an aluminum foil lidding to its other side. There do not appear to be any adequate aluminum foil or plastics heat seal coatings for sealing to a high fluorine content surface. Consequently, in the past it has been necessary in such cases to produce a basic PVC/Aclar® product using a dry bonding laminating adhesive and then to heat seal aluminum foil to the PVC surface while adhering the printed PVC card to the high fluorine content surface by means of ultrasonic welding. The PVC card is provided with a heat seal coating on the side opposite of the printing to allow for adhering the card to the high fluorine content surface by means of ultrasonic welding. The ultrasonic welding process increases the temperature of the high fluorine content surface and the PVC card, allowing the two materials to fuse together. The resultant product has several disadvantages. First, there is poor adhesion between the high fluorine content surface and the coated surface of the printed PVC card so that the printed PVC cards will occasionally detach from the blister package. The poor adhesion is due to the basic incompatibility between the high fluorine content surface and the adhesive-coated PVC card. Second, the ultrasonic welding increases the temperature of the blister package which can create holes in the package. These holes can compromise the package barrier thereby causing leaking. Finally, the ultrasonic welding of the package is performed manually at a significant cost in time and labor thereby reducing productivity and increasing costs.

There exists, therefore, a need for a material having the high moisture vapor barrier properties of a high fluorine content layer but without the adhesive difficulties inherent in layers comprised of fluoro-polymers alone or the disadvantages encountered when ultrasonic welding is used.

SUMMARY OF THE INVENTION

The present invention relates to blister packages. It has particular utility in the pharmaceutical industry for the packaging, storing and dispersal of medications although it may also be used in a variety of other fields such as the food industry and general retailing. A three part, unoriented laminate film having a crystallinity level of 35% or less for use in such packaging is disclosed which may be thermoformed and includes a high moisture barrier. The central core layer of the laminate is a fluoro-polymer-based sheet material. Separate polymer films are attached adhesively to each side of the central core layer. The polymer films may be the same or differ from each other chemically depending on the characteristics sought.

An alternative embodiment would provide a package structure in which the laminated film would not be thermoformed but would be used as a flat sheet to which a pouch containing a product could be attached.

It is a primary objective of this invention to provide a laminated material for use in blister packaging incorporating a fluoro-polymer which can be readily sealed on both surfaces while maintaining good inter-laminar strength within the laminated material itself.

An additional objective of this invention is to provide a laminated film for use in blister packaging having a high moisture barrier.

Another objective of this invention is to provide a laminated film incorporating a core fluoro-polymer layer to which both aluminum foil and plastic heat seal coatings can be applied.

It is a further objective of this invention to provide a laminated film which reduces the length of time needed for ultrasonic welding in the package forming process thereby virtually eliminating the likelihood that holes will be created in the resulting blister package due to prolonged exposure to increased temperatures associated with the welding process.

It is yet another objective of this invention to provide a laminated film which will increase the speed with which blister packages requiring high moisture barriers can be made by replacing manual ultrasonic welding with automated ultrasonic welding thereby increasing productivity and reducing costs.

It is still another objective of this invention to provide a laminated film with improved inter-laminar adhesion and decreased likelihood of inter-laminar detachment.

Yet an additional objective of this invention is to provide a laminated film for use in a blister packages which have a lower coefficient of friction and better "denest" properties than similar packages of the prior art.

Still another objective of this invention is to provide a three layer laminated structure to the outer surface of which a PVC printed card will adhere without the need for a heat seal coating, thereby reducing production costs and wherein the structure includes a core layer comprised of a fluoro-polymer product.

Yet a further object of this invention is to provide a three layer laminated structure in which the outer layers may be symmetrical or asymmetrical with respect to each other in that they may be of equal or differing thicknesses and/or of the same or differing materials.

Still another object of this invention is to reduce the possibility that a laminated film including a fluoro-polymer based product such as Aclar® will stick to machine heating plates and tooling when exposed to high temperatures during a manufacturing process.

Yet an additional object or this invention is to produce a symmetrical, three layer laminated film employing a fluoro-polymer based product such as Aclar® for use in manufacturing packaging in which package curl may be substantially reduced in comparison with two layer films known in the art.

Still another object of this invention is to provide a three layer laminated product employing a fluoro-polymer central layer for use in manufacturing blister packaging having improved moisture barrier characteristics when compared with known two layer products used for the same purpose.

Yet another object of this invention is to provide a three layer laminated product for use in packaging which lends itself easily to the application of printing and/or coating onto an outside layer of the product.

BRIEF DESCRIPTION OF THE DRAWINGS

The foregoing and other objects, aspects and advantages of the invention will be better understood from the following detailed description of the invention with reference to the drawings, in which.

DESCRIPTION OF THE INVENTION

Figure 1:
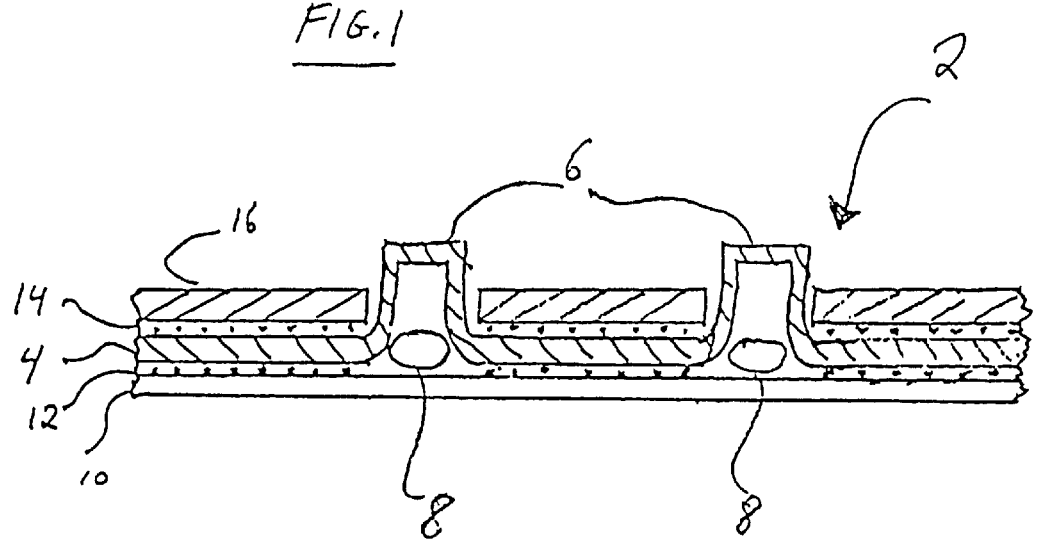
FIG. 1 is a cross-sectional view of a blister package incorporating the fluoro-polymer laminated layer of this invention.

For a more detailed understanding of the invention, reference is first made to FIG. 1 of the drawings. This figure illustrates a cross-sectional view of a blister package 2 having a laminated layer 4 which is preferably thermoformed into a shape including protrusions 6 into which pills 8 may be inserted prior to sealing of the package with aluminum foil layer 10. A first adhesive layer 12 may be used to attach layer 10 to a first side of layer 4. A second adhesive layer 14 may be used to attach a printed PVC card 16 to a second opposing side of layer 4. Adhesive layers 12 and 14 are heat seal coatings which are activated by heat but are not tacky at room temperature. Typically, adhesive layers 12 and 14 are acrylic-vinyl coatings to allow them to seal adequately to PVC. Card 16 may be printed with important product information and/or graphics as desired by the end user.

Figure 2:
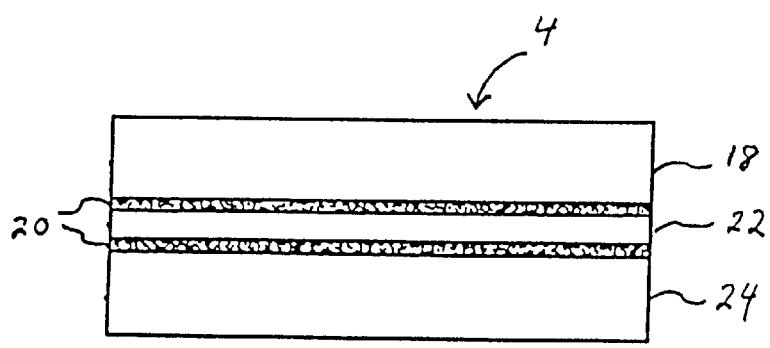
FIG. 2 is a cross-sectional view of a fluoro-polymer laminated layer as used in the package of FIG. 1.

The structure of layer 4 is depicted in cross-section in FIG. 2. A first polymer film 18 may be attached by means of an adhesive 20 to one side of a fluoro-polymer-based product 22. A second polymer film 24 is then fixed, also by means of adhesive 20, to the opposing side of product 22. Adhesive 20 is typically a dry bond laminating adhesive which is heat activated and is tacky at room temperature. If polymer films 18 and 24 were different from each other, it might be necessary to use a different type of adhesive to cause each to adhere to the respective sides of product 22, but the adhesive chosen would be specifically chemically and physically compatible with that polymer film and product 22. Details of the process for forming layer 4 are set forth below. Polymer films 18 and 24 are preferably PVC but one or both may alternatively be other polymer films including, but not limited to, amorphous PET (APET), PETG, a rubber modified nitrile polymer such as Barex® (a registered trademark of BP Chemicals, Inc.), polypropylene or polystyrene. Each of these alternatives has different desirable properties. For example, where gamma sterilization is required, such as in the medical device industry, a PETG film can be used since PVC cannot be so sterilized without being degraded and yellowed. If an additional oxygen barrier is required, which occurs commonly in the food packaging industry for purposes of flavor protection of meats and cheeses land sometimes in the pharmaceutical industry, a rubber modified nitrile polymer film such as Barex® can be employed since it provides an additional oxygen barrier to the product along with the moisture barrier otherwise provided by product 22. In some cases, a halogen-free contact surface is required. In these instances, the use of polypropylene or polystyrene is appropriate. Polymer films 18 and 24 are preferably each approximately 5.0 mils thick although different thicknesses in the range of approximately 0.5 mils to 15 mils may be used. Furthermore, laminated layer 4 may be either symmetrical or asymmetrical in structure such that polymer films 18 and 24 may be comprised of the same or of different materials and may have the same or different thicknesses. For example, polymer film 18 could be 5.0 mils thick and be comprised of PVC while polymer film 24 could be 7.5 mils thick and comprised of PETG. Product 22 is preferably a fluoro-polymer-based product and may be poly chloro-tri-fluoro ethylene such as Aclar®. Aclar® has good thermal and chemical stability and is well-suited for thermoforming processes. Furthermore, Aclar® is the transparent product having the highest moisture barrier currently available on the market. Only opaque aluminum foil has better moisture barrier properties. However, fluoro-polymer-based films from other manufacturers may also be used. In an alternative embodiment, a polyvinylidene chloride (PVdC) product may be substituted for the fluoro-polymer product 22. Such a substitute would be desirable where both moisture and oxygen protection is sought. Since PVdC becomes tacky when heated, causing potential damage to machinery with which it comes in contact, and also emits a low level of HCl gas when heated, undesirably corroding machinery with which it is in close proximity, encapsulation of the PVdC between layers of PVC is required. Such encapsulation eliminates the tackiness and greatly minimizes the release of HClgas. Product 22 preferably has a thickness of approximately 2 mils although the thickness can range from approximately 0.3 mils to 5.0 mils. Adhesive 20 is preferably a two-component water-based polyurethane dry-bond laminating adhesive. The polyurethane adhesive uses epoxy-amine cross-linking chemistry to achieve an excellent bond between polymer films 18 and 24 as well as product 22. Layer 4 may have a high gloss, be transparent, or be colored or opaque, as desired and is presented as a sheet-like material which may be stored and transported as a roll. A master roll of layer 4 when mass-produced has a typical width which may be between 1000 and 1600 millimeters and a typical length which may be between 1000 and 2500 meters. Master rolls may be converted to smaller slit rolls that may be typically produced in widths from 80 to 600 millimeters and lengths from 200 to 2500 meters. Table I presents an exemplary range of technical specifications for layer 4 in the case where PVC is used as polymer films 18 and 24 and Aclar® is used as product 22.

TABLE I

| Property | Test Method | Unit of Measure | Value Range |
| --- | --- | --- | --- |
| Total Thickness | TM-66 | Mils | 1.3 to 35.0 |
| PVC Thickness (each Layer) | TM-66 | Mils | 0.5 to 15.0 |
| PVC Gauge Tolerance | TM-66 | % | ±5 |
| ACLAR ® Thickness | TM-66 | Mils | 0.3 to 5.0 |
| ACLAR ® Gauge Tolerance | TM-66 | % | ±15 |
| Yield | TM-51 | in$^2$/lb | 1400 to 1900 |

The process of creating layer 4 involves two separate laminating operations. Where PVC is used as polymer films 18 and 24 and Aclar® comprises product 22, the first operation begins with unwinding the PVC substrate from a motor-driven winder. Motor driven winders are located on the unwind and rewind to control the speed of the material through the machine. Load cells are located throughout the machine to control and isolate the tension of the material throughout the process. After the PVC is unwound, the PVC passes through a corona treater, which increases the dyne level of the PVC to approximately 50 dyne. The corona treater serves to activate the surface of the PVC, to allow for better bond or adhesion of the adhesive to the PVC. After corona treatment, the water-based adhesive is applied to the surface of the PVC that has been corona treated. The water-based adhesive is applied by a reverse gravure coating method. Reverse gravure coating requires that the adhesive be supplied to a chrome plated engraved roll rotating in the reverse or opposite direction of the PVC web. The adhesive is metered to a precise quantity onto the PVC by a metal doctor blade. The engraved coating cylinder transfers the adhesive to the PVC. The coating cylinder is rotating at a speed between 90–150% of line-speed. The machine line-speed is anywhere between 50 m/min and 200 m/min. After the adhesive is applied to the PVC, it is transported into a vertical dryer. The vertical dryer uses forced air convection through slotted nozzles to remove the moisture from the adhesive and exhaust the moisture into the atmosphere. The drying air is heated to anywhere between 50–150° C. After leaving the dryer, the PVC with dried adhesive is laminated directly to the Aclar® by a hot nip. The hot nip uses a heated chrome roll and a rubber roll to bond the PVC and Aclar® together. The Aclar® laminate is transported into the nip from a motor driven laminating unwind. The Aclar® first travels through a corona treater to increase the dyne level of the Aclar® surface to approximately 50 dyne. The corona treated Aclar® surface is what is bonded to the PVC/adhesive surface in the hot nip laminator. Once the PVC and Aclar® are combined, the structure travels through the machine into another dryer. The second dryer is a horizontal forced air convection dryer with nozzles to supply heated air at a high velocity. The air is heated to approximately 50° C. The purpose of the dryer is to allow for complete drying of the adhesive and to allow for better bonding between the PVC and Aclar® by cross-linking or hardening the adhesive. After the PVC/Aclar® laminate structure leaves the second dryer, it is cooled by moving it across a chilled cylinder. After cooling the material is rewound into a roll by a motor driven rewind.

The second operation is almost identical to the first with a few exceptions. The machine is operating under the same conditions as in the first operation. Instead of PVC being used as the original substrate on the primary unwind, the PVC/Aclar® lamination is placed on the primary unwind. Instead of Aclar® being placed on the laminating unwind, PVC is placed on the laminating unwind. The rest of the process is the same as the above description. The adhesive is applied directly to the Aclar® side of the PVC/Aclar® laminate after the Aclar® surface is corona treated. The PVC on the laminating unwind is also corona treated to 50 dyne. The corona treated surface of the PVC is laminated directly to the Aclar side of the PVC/Aclar® laminate. The resulting three layer laminated material may then be wound onto a winder and shipped or used for further processing to make blister packages as described above.

By employing layer 4 in the above-described blister package and manufacturing layer 4 as described above, numerous advantages are secured. First, the structure of layer 4 permits printed PVC card 16 to be sealed to the PVC blister surface with significantly improved adhesion and without subsequent detachment from layer 4. Second, when printed PVC card 16 is ultrasonically welded to layer 4, less processing time is required since manual ultrasonic welding is no longer necessary, as it was in the prior art. In order to use an automated ultrasonic welding process, a product must be provided which can seal printed cards to packages at the same speed that a blister machine produces packages. In prior art PVC/fluoro-polymer structured packages, the PVC/fluoro-polymer could not be sealed fast enough in the ultrasonic welding process to keep up with the blister machine. Thus, the blister machine would run at less than 50% of capacity due to the bottleneck created by the ultrasonic welding process. Layer 4 of the present invention eliminates this bottleneck permitting automatic ultrasonic welding and maximum utilization of the capacity of blister machines. In addition, due to the increased process speed, the temperature of blisters produced is reduced. Due to this reduced temperature, an insignificant number of leaking blisters are produced. This represents a significant improvement from other products known in the art. Third, the reduced processing time for ultrasonic welding allows the package to be assembled without any production bottlenecks. Elimination of manual ultrasonic welding allows the product to be produced on an automated machine. Fourth, packages produced with the PVC/fluoro-polymer/PVC layer 4 of this invention have a lower coefficient of friction than similar packages of the prior art employing a PVC/fluoro-polymer structure. It is sometimes desirable to have good "denest" properties, meaning that multiple packages stacked together can be easily separated. PVC has a lower coefficient of friction than fluoro-polymers so that a structure in which PVC, rather than a fluoro-polymer, is the surface exposed during stacking has improved "denest" properties. Fifth, problems may arise with current two-layer Aclar® products since the Aclar® may stick to machine heating plates and tooling when exposed to elevated temperatures. Consequently, users must coat their machine surfaces with Teflon®, a registered trademark of E.I. du Pont de Nemours and Company, to reduce this sticking problem. By embedding a fluoro-polymer such as Aclar® between two layers of film, the product of the present invention performs better on F/F/S blister machines than existing products since it does not stick as readily to machine surfaces. Sixth, current two-layer Aclar® product can have problems with package curl, which is partly due to the asymmetrical structure of the product. Users must modify package design and aluminum foil lidding material in order to reduce package curl. By employing a symmetrical three-layer structure in which the outer layers are of substantially equal thickness and of similar materials, as disclosed in the present invention, such problems with package curl are significantly reduced. Such symmetry balances the thermo mechanical properties of the total three-layer structure. Depending on the package construction, a reduction of between 10% and 100% in package curl is obtainable when compared with a standard two-layer Aclar® product as currently known in the art. The package construction variables effecting curl are package seal area, aluminum foil lidding material (hard-tempered or soft-tempered), package perforation and package material. The least amount of package seal area allows for reduced package curl. Soft-tempered aluminum foil allows for reduced package curl as compared to hard-tempered foil. Package perforation allows for reduced package curl as compared to packages with no perforation. This reduced curl property is desirable to users, because it allows the packages to process easier on their equipment. Packages with reduced curl will allow for fewer machine upsets since the packages will transport through machinery more smoothly and more efficiently. Reduction of curl is also observed with the three-layer structure while being processed on a F/F/S thermoforming machine prior to sealing to aluminum foil. This property is desirable to a user because it allows better machining of the material. Seventh, the three layer laminated structure of the present invention provides an improved moisture barrier when compared with the standard two-layer products incorporating a fluoro-polymer layer as currently known in the art. When used to form blister packaging, the laminated layer of this invention can provide a 15–35% improvement in moisture barrier characteristics over known two-layer products incorporating a fluoro-polymer layer. Finally, when the three layer product of this invention is employed to manufacture packaging, printing and/or coating can be directly applied to the outside layers of the product. Thus, coatings such as adhesives, coefficient of friction reducers, and additional barrier coatings may be applied. Known two-layer structures cannot be easily printed or coated due to the fluoro-polymer nature of one layer of the product. By having the three-layer structure, the outside surface of the package can be printed more readily due to compatibility of ink systems with the PVC or other polymer surfaces. This is desirable to a user, since it will allow that user to print information such as expiration dates and lot numbers directly on the package. This information is currently printed on the aluminum foil lidding material or the secondary packaging such as a carton or pouch.

An alternative package structure could employ layer 4 in a flat, non-thermoformed configuration. A pouch containing a product could then be attached to layer 4. Such a use would be desirable due to the two-sided sealing characteristics of layer 4.

Although various elements in the previously described embodiments of this invention have been disclosed with reference to particular types of materials, it should be understood that the functions performed by these materials may also be performed in appropriate cases by other types of materials and that this invention is not limited by reference to the specific materials disclosed. Furthermore, the embodiments described above are not to be construed as the only possible implementations of this invention. While the invention has been described in its preferred embodiments, it is to be understood that the words which have been used are words of description rather than of limitation and that changes may be made within the purview of the appended claims without departing from the true scope and spirit of the invention in its broader aspects. The inventors further require that the scope accorded their claims be in accordance with the broadest possible construction available under the law as it exists on the date of filing hereof, and that no narrowing of the scope of the appended claims be allowed due to subsequent changes in the law, as such a narrowing would constitute an ex post facto law, and a taking without due process or just compensation.

What is claimed is:

1. A thermoformable, unoriented, three-layer, dry bond laminated material having moisture vapor barrier characteristics and a crystallinity level suitable for use in manufacturing a blister package for pharmaceuticals comprised of:
   a two-sided core layer of poly chloro-tri-fluoro ethylene;
   a first polymer film attached to a first side of said core layer; and
   a second polymer film attached to the opposing side of said core layer, wherein said first polymer film and said second polymer film are symmetrical with regard to each other both as to both thickness and chemical composition of material used and wherein further the laminated material has a crystallinity level of 35% or less.

2. The three-layer laminated material of claim 1 wherein the three-layer structure reduces sticking of the material to machinery when exposed to elevated temperatures during manufacturing in comparison with two-layer laminated materials comprised of said core layer laminated to another polymer film.

3. The three-layer laminated material of claim 1 wherein package curling during manufacturing is reduced due to the symmetrical relationship between said first polymer film and said second polymer film in comparison with two-layer laminated materials comprised of said core layer laminated to another polymer film.

4. The three-layer laminated material of claim 3 wherein the comparative reduction in package curling is at least 10% but not more than 100%.

5. The three-layer laminated material of claim 1 wherein the structure of the material results in an improvement of at least 15% but not more than 35% in the moisture barrier characteristics of the material in comparison with two-layer laminated materials comprised of said core layer laminated to another polymer film.

6. The three-layer laminated material of claim 1 wherein either coatings or printing or both coatings and printing are applied directly to the nonattached surface of either said first or said second polymer film.

7. The three-layer laminated material of claim 1 wherein said first polymer film and said second polymer film are both any one selected from the group consisting of PVC, APET, PETG, a rubber modified nitrile polymer, polypropylene or polystyrene.

8. The laminated material of claim 1 wherein said core layer has a thickness of at least 0.3 mils but no more than 5.0 mils.

9. The three-layer laminated material of claim 1 wherein said first polymer film and said second polymer film each have the same thickness which is at least 0.5 mils but not more than 15 mils.

10. The three-layer laminated material of claim 1 wherein the material has a total thickness of at least 1.3 mils but not more than 35 mils.

11. The laminated material of claim 1 wherein the dry bond adhesive used to bind the layers together is a two-component, water-based polyurethane.

12. A thermoformable, unoriented, three-layer, dry bond laminated material having moisture vapor barrier characteristics and a crystallinity level suitable for use in manufacturing a blister package for pharmaceuticals comprised of:
- a two-sided core layer of poly chloro-tri-fluoro ethylene;
- a first polymer film attached to a first side of said core layer; and
- a second polymer film attached to the opposing side of said core layer, wherein said first polymer film and said second polymer film are asymmetrical with regard to each other as to either thickness or chemical composition of material used or both thickness and chemical composition of material used and wherein further the laminated material has a crystallinity level of 35% or less.

13. The three-layer laminated material of claim 12 wherein said first polymer film and said second polymer film are each any one selected from the group consisting of PVC, APET, PETG, a rubber modified nitrile polymer, polypropylene or polystyrene.

14. The three-layer laminated material of claim 12 wherein said core layer has a thickness of at least 0.3 mils but not more than 5.0 mils.

15. The three-layer laminated material of claim 12 wherein said first polymer film and said second polymer film each have a thickness of at least 0.5 mils but not more than 15 mils.

16. The three-layer laminated material of claim 12 wherein the material has a total thickness of at least 1.3 mils but not more than 35 mils.

17. The three-layer laminated material of claim 12 wherein the three-layer structure reduces sticking of the material to machinery when exposed to elevated temperatures during manufacturing in comparison with two-layer laminated materials comprised of said core layer laminated to another polymer film.

18. The three-layer laminated material of claim 12 wherein the structure of the material results in an improvement of at least 15% but not more than 35% in the moisture barrier characteristics of the material in comparison with two-layer laminated materials comprised of said core layer laminated to another polymer film.

19. The three-layer laminated material of claim 12 wherein either coatings or printing or both coatings and printing are applied directly to the nonattached surface of either said first or said second polymer film.

20. The laminated material of claim 12 wherein the dry bond adhesive used to bind the layers together is a two-component, water-based polyurethane.

21. A thermoformable, unoriented, three-layer, dry bond laminated material having moisture vapor barrier characteristics and a crystallinity level suitable for use in manufacturing a blister package for pharmaceuticals comprised of:
- a two-sided core layer of polyvinylidene chloride having a thickness of at least 0.3 mils but not more than 5.0 mils;
- a first PVC layer having a thickness of at least 0.5 mils but not more than 15 mils adhesively attached by means of a heat-activated dry bond laminating adhesive to a first side of said core layer; and
- a second PVC layer having a thickness of at least 0.5 mils but not more than 15 mils adhesively attached by means of a heat-activated dry bond laminating adhesive to a second side of said core layer.

* * * * *